(12) United States Patent
Himmelmann et al.

(10) Patent No.: US 8,262,531 B2
(45) Date of Patent: Sep. 11, 2012

(54) ACTUATOR WITH DIFFERENTIAL AND BRAKE

(75) Inventors: Richard A. Himmelmann, Beloit, WI (US); David Lang, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 349 days.

(21) Appl. No.: 12/640,482

(22) Filed: Dec. 17, 2009

(65) Prior Publication Data
US 2011/0146446 A1    Jun. 23, 2011

(51) Int. Cl.
*F16H 35/10* (2006.01)
*F16H 25/20* (2006.01)

(52) U.S. Cl. ....... 475/263; 475/149; 74/89.39; 74/89.37

(58) Field of Classification Search ................ 74/89.39, 74/89.37, 89.38, 89.23; 475/149, 153, 254, 475/263, 265; 477/182, 20; 244/99.9, 231
See application file for complete search history.

(56) References Cited

U.S. PATENT DOCUMENTS

| | | | |
|---|---|---|---|
| 3,766,790 A * | 10/1973 | Weir | 74/89.26 |
| 5,193,408 A | 3/1993 | Fukui et al. | |
| 5,630,490 A * | 5/1997 | Hudson et al. | 192/223.3 |
| 6,179,739 B1 | 1/2001 | Tsai et al. | |
| 6,231,012 B1 * | 5/2001 | Cacciola et al. | 244/213 |
| 6,260,799 B1 | 7/2001 | Russ | |
| 6,419,606 B1 * | 7/2002 | Tengan et al. | 475/5 |
| 6,638,029 B2 | 10/2003 | Kharsa | |
| 6,704,625 B2 | 3/2004 | Albero et al. | |
| 6,776,376 B2 | 8/2004 | Collins | |
| 2007/0169578 A1 * | 7/2007 | Christensen et al. | 74/89.37 |
| 2009/0090204 A1 * | 4/2009 | Jones et al. | 74/89.39 |

FOREIGN PATENT DOCUMENTS

| | | |
|---|---|---|
| DE | 44 47 395 A1 | 6/1996 |
| EP | 2 048 413 A1 | 4/2009 |
| WO | WO 98/30816 A1 | 7/1998 |

OTHER PUBLICATIONS

European Search Report; Application No./Patent No. 10252119.2-2421; Reference 30.108091; Applicant: Hamilton Sundstrand Corporation; dated May 2, 2011 pp. 1-6.

* cited by examiner

*Primary Examiner* — Sherry Estremsky
*Assistant Examiner* — Lillian Nguyen
(74) *Attorney, Agent, or Firm* — Cantor Colburn LLP

(57) ABSTRACT

An actuator (100) includes a differential (105), the differential comprising a gear train comprising a first leg (106*a*) and a second leg (106*b*); a motor (101) configured to power a rotating ball screw (104) through the first leg (106*a*) of the differential (105); and a brake (103) connected to the second leg (106*b*) of the differential (105), the brake (103) having a holding force, such that in the event a torque in the differential (105) exceeds the holding force, the brake (103) is configured to dissipate the torque in the differential (105).

10 Claims, 1 Drawing Sheet

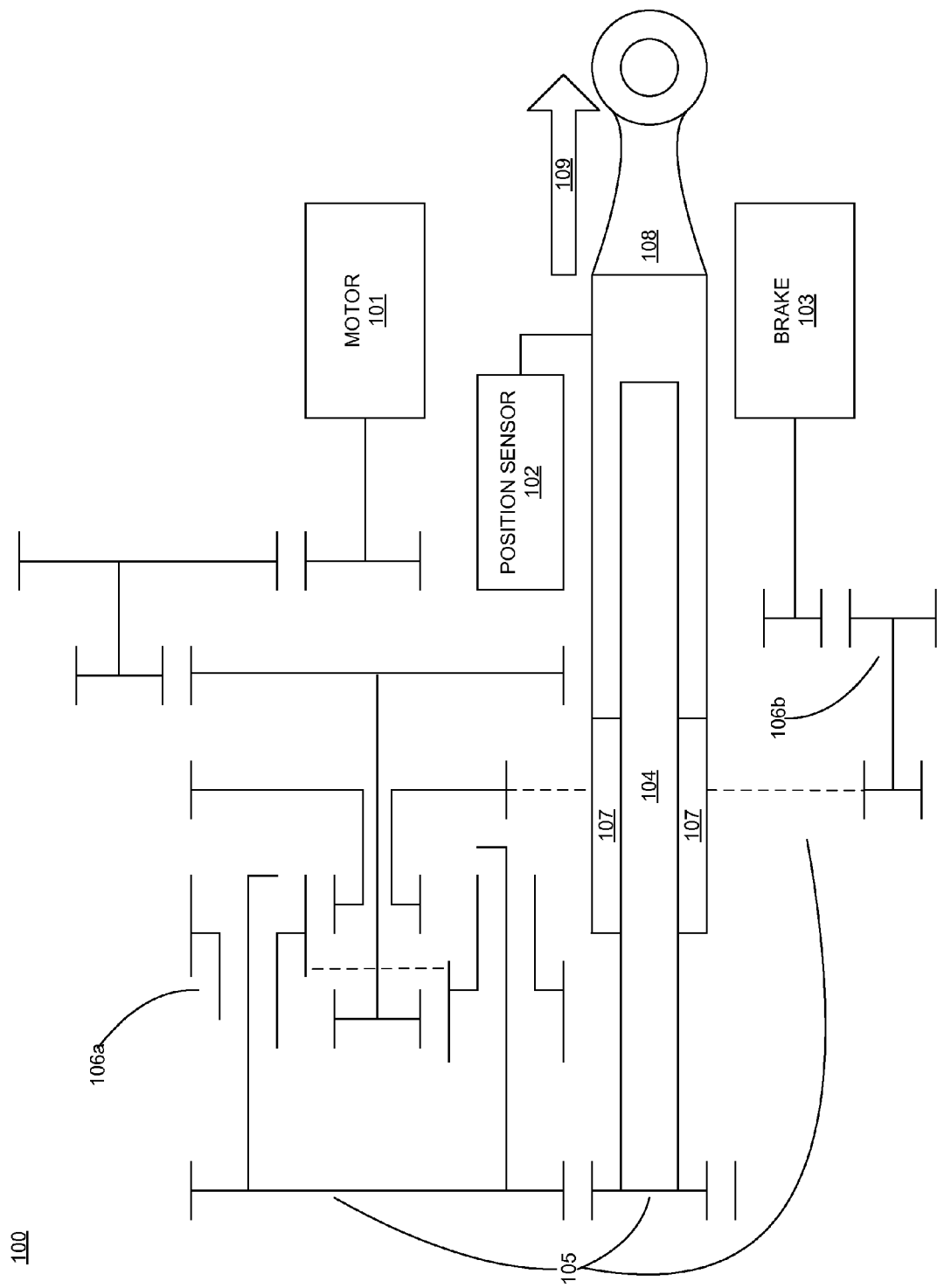

ACTUATOR WITH DIFFERENTIAL AND BRAKE

FIELD OF INVENTION

The subject matter disclosed herein generally pertains to the field of actuators.

DESCRIPTION OF RELATED ART

A linear actuator is a machine designed to provide force and linear displacement to an object. A linear actuator may comprise an electromechanical actuator (EMA), wherein the actuator is powered by an electric motor. EMAs offer increased efficiency over hydraulic or pneumatic linear actuators while eliminating fire hazards and leakage problems associated with hydraulic fluids used in hydraulic actuation systems.

In order to create an EMA with a large force capability, either the EMA's electric motor must be capable of producing a large torque, or the actuator's gear train must reduce the motor's output torque requirement. A motor with a large torque capability usually contains a significant amount of rotational inertia in its rotor. A gear reduction system that decreases the motor's output torque requirement reduces the motor's physical size and rotational inertia, however, it requires the motor to operate at a higher speed. The rotational inertia of the motor at the actuator output is proportional to the motor's inertia multiplied by the gear reduction ratio squared.

The sizing of the EMA, including gear train, ball screw, and overall structure, are determined by the rotational inertial of the EMA motor and by transient overload conditions, or transient force spikes, that the EMA may experience during operation. A transient force spike may result from, for example, a rocket engine start. The transient force spike may cause the ball screw to try to back drive the motor; the motor's rotational inertia will, however, resist being back driven. During a transient force spike, the EMA may be allowed to drift; however, the high rotational inertia of the motor may prohibit the rapid acceleration needed to relieve a transient force spike. In order for an EMA to mechanically support high transient loads, the EMA may be designed to be relatively large and heavy. Alternately, a dynamic slip clutch may be incorporated into the EMA driveline, allowing de-coupling of the motor from the EMA gear train. However, a dynamic clutch may add rotational inertia to the driveline during normal operation, which may impact the EMA's frequency response performance. In order for the EMA to meet frequency response requirements, the motor may be oversized to provide additional torque necessary to overcome the inertia added by the dynamic clutch. The dynamic clutch and corresponding larger motor may result in a relatively large, heavy, and complex EMA.

A transient force spike may also occur when the ball screw hits an internal stop or end stop. The motor's rotational inertia will attempt to continue driving the ball screw through the stop. If the stop is strong enough to withstand the force spike, the next weakest link, either the ball screw or the gear train driving the ball screw, may be damaged. This scenario may be overcome by designing the gear train and the EMA stops to handle the torque spike associated with the rapid deceleration of the motor that occurs when the actuator hits a hard stop. The EMA's internal shafting may flex as the motor spins down, providing torsional compliance. However, this design approach may cause the EMA to be larger and heavier than required to handle normal operating loads.

BRIEF SUMMARY

According to one aspect of the invention, an actuator includes a differential, the differential comprising a gear train comprising a first leg and a second leg; a motor configured to power a rotating ball screw through the first leg of the differential; and a brake connected to the second leg of the differential, the brake having a holding force, such that in the event a torque in the differential exceeds the holding force, the brake is configured to dissipate the torque in the differential.

Other aspects, features, and techniques of the invention will become more apparent from the following description taken in conjunction with the drawing.

BRIEF DESCRIPTION OF THE SEVERAL VIEWS OF THE DRAWINGS

Referring now to the drawing wherein like elements are numbered alike in the FIGURE:

FIG. 1 illustrates an embodiment of an actuator comprising a differential and brake.

DETAILED DESCRIPTION

Embodiments of an actuator comprising a differential and brake are provided, with exemplary embodiments being discussed below in detail.

As shown in FIG. 1, actuator 100 comprises a differential 105, which comprises a gear train comprising a first leg 106a and a second leg 106b. Differential 105 may comprise a speed-summing differential. Motor 101 may comprise an electric motor, and actuator 100 may comprise an EMA. In normal operation, motor 101 drives ball screw 104 through first leg 106a of the differential 105, causing ball screw 104 to rotate. The rotation of ball screw 104 engages with translating nut 107, moving translating member 108 in the direction indicated by arrow 109. The brake 103 holds and balances the output torque of the motor 101 across the differential 105 via second leg 106b. In some embodiments, differential 105 acts as a 2:1 gear reduction stage. The position sensor 102 may send position data regarding translating nut 107 and/or translating member 108 to a controller (not shown).

Transient force spikes may occur in actuator 100. Causes of a transient force spike may include but are not limited to a rocket engine start, or the ball screw 104 hitting an internal stop or end stop at a relatively high speed. The ball screw 104 may attempt to back drive motor 101 via differential leg 106a, or motor 101 may attempt to drive the ball screw 104 through the stop. The rotational inertia of motor 101 causes the torque in differential 105 to rise under the transient force spike. The rising torque in differential 105 is transferred to brake 103 via second differential leg 106b. When the torque in differential 105 exceeds the holding force of brake 103, the brake 103 slips and rotates, dissipating excess torque and protecting the actuator 100. The holding force of brake 103 may be equal to the maximum output torque of motor 101 in some embodiments. The brake 103 may comprise any appropriate brake configuration for dissipating a transient force spike. The brake 103 may comprise a friction material in some embodiments.

The technical effects and benefits of exemplary embodiments include dissipation of transient force spikes in an actuator. The brake allows the actuator to be designed to handle operating loads, and not transient loads, decreasing the required size and weight of the actuator.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An actuator (100) comprising:
  a differential (105), the differential comprising a gear train comprising a first leg (106a) and a second leg (106b);
  a motor (101) configured to power a rotating ball screw (104) through the first leg (106a) of the differential (105); and
  a brake (103) connected to the second leg (106b) of the differential (105), the brake (103) having a holding force, such that in the event a torque in the differential (105) exceeds the holding force, the brake (103) is configured to dissipate the torque in the differential (105).

2. The actuator of claim 1, wherein the motor (101) comprises an electric motor, and the actuator (100) comprises an electromechanical actuator (EMA).

3. The actuator of claim 1, further comprising a translating nut (107) engaged with the rotating ball screw (104), the translating nut (107) configured to translate linearly.

4. The actuator of claim 3, further comprising a position sensor (102), the position sensor configured to send data regarding a position of the translating nut (107) to a controller.

5. The actuator of claim 1, wherein the holding force of the brake (103) is equal to a maximum output torque of the motor (101).

6. The actuator of claim 1, wherein the brake (103) is configured to rotate in the event the torque in the differential (105) exceeds the holding force.

7. The actuator of claim 1, wherein the torque in the differential (105) comprises a transient force spike.

8. The actuator of claim 1, wherein the differential (105) comprises a speed-summing differential.

9. The actuator of claim 1, wherein the differential (105) comprises a 2:1 gear reduction stage.

10. The actuator of claim 1, wherein the brake (103) comprises a friction material.

* * * * *